United States Patent
Benham

(10) Patent No.: US 7,168,458 B2
(45) Date of Patent: Jan. 30, 2007

(54) WATER TREATMENT PRODUCT, DELIVERY METHOD AND MEANS OF PACKAGING

(76) Inventor: Roger A. Benham, 4005 LaSalle St., San Diego, CA (US) 92110

( * ) Notice: Subject to any disclaimer, the term of this patent is extended or adjusted under 35 U.S.C. 154(b) by 344 days.

(21) Appl. No.: 10/729,995

(22) Filed: Dec. 9, 2003

(65) Prior Publication Data

US 2004/0112843 A1   Jun. 17, 2004

Related U.S. Application Data

(60) Provisional application No. 60/432,242, filed on Dec. 11, 2002.

(51) Int. Cl.
*B65B 1/04* (2006.01)

(52) U.S. Cl. .............................. 141/2; 141/18; 141/67; 141/114; 137/572

(58) Field of Classification Search ................ 141/2, 141/18, 32, 67, 98, 114, 198, 10; 222/1, 222/148, 325; 137/571, 572
See application file for complete search history.

(56) References Cited

U.S. PATENT DOCUMENTS

| 6,105,638 A | * | 8/2000 | Edwards et al. ............. 141/330 |
| 6,341,628 B1 | * | 1/2002 | Burson ......................... 141/67 |
| 6,675,842 B1 | * | 1/2004 | Fitter .......................... 141/114 |

FOREIGN PATENT DOCUMENTS

| EP | 620 156 | 10/1994 |
| WO | WO 91/11879 | 8/1991 |

* cited by examiner

*Primary Examiner*—Timothy L. Maust
(74) *Attorney, Agent, or Firm*—Hoffman, Wasson & Gitler, P.C.

(57) ABSTRACT

A water treatment product comprising a mixture of at least one active ingredient and a first fluid, wherein the concentration in the product of the active ingredient is at least 50% on a weight basis and the viscosity of the product is at least 2,000 centipoise or 2 pascal seconds, the product adapted to be further diluted upon addition to a second fluid stream to be treated.

25 Claims, 6 Drawing Sheets

WATER TREATMENT PRODUCT, DELIVERY METHOD AND MEANS OF PACKAGING

The present application is based upon U.S. provisional patent application No. 60/432,242, filed 11 Dec. 2002.

BACKGROUND OF THE INVENTION

1. Field of the Invention

The present invention relates to an improved water treatment chemical product and in particular to a water treatment product, packaging means, dispensing means, and delivery means for the water treatment product.

2. Discussion of Related Art

Many industrial, commercial, institutional, and residential water supplies suffer from objectionable conditions. Often, treatment measures are implemented with the addition of chemical treatments to the water supply, including for example phosphate or silicate compounds. In order to make the addition of the chemical treatment into the water supply, the chemical product must be made available in a deliverable and usable form.

Products and delivery methods for water treatment processes are known. In the most commonly used form, the water treatment material for point-of-use applications is delivered as a solid, powdered, platelet, or granular material. The material could be packaged in a number of ways, ranging from bulk containers and bins, to smaller packages, pails, or cartridges.

Examples include many commonly available water treatment compositions which are often delivered or sold in bags (whether cloth, paper or plastic) or buckets. Perhaps the most common water treatment composition, commercially available pool chlorine, gives an indication of the variety of ways in which the chemical may be available. The problem faced by users of the chemical is that chlorine for example may be toxic and it is unwise to allow the chlorine to contact exposed skin and especially the eyes.

The form in which the chemical is available also often defines the packaging that the product may be sold in. For example, due to the fact that chlorine release agents are noxious, they are generally not sold in paper bags and almost always sold in plastic buckets.

In smaller, point-of-use type, removable cartridge type, bypass or flow-through type dispensers, the most widely used water treatment materials are either powdered, platelet, granular, or solid products. These materials are slowly dissolved and are dispensed into the water flow-stream. The vessel in which the water treatment product is contained typically requires constant attention. This is typically caused because insoluble compounds form in the dispensers causing the materials to cake-up, or become mushy, and clog the dispenser fittings and tubing.

With powdered, platelet, granular, or solid water treatment products, the formation of insoluble materials limits the time the dispensers can be used without servicing. In some cases, up to 50% of the water treatment product can be transformed into an insoluble mush (typically a form of calcium phosphate).

Typical with powdered, platelet, granular, or solid products, after the operator pours in the material and fills the dispensing vessel with water, a period of time must be allowed for all the material to soak, and the entrapped air or gases to rise up and out of the material. Typically, a bleed-screw is used to attempt to vent out all of the entrapped air or gas after the vessel has been pressurized.

Another form of water treatment material is a liquid product. Liquid products are typically dispensed using a mechanical metering pump. The use of a metering pump has the effect of limiting the concentration of the solids suspended in solution as different pump types are not amenable to the pumping of solids in solution. If the concentration of solids is too high, then the pump can be fouled and its operating life shortened.

An important distinction in the above discussion is the difference between a solution and a suspension. Suspensions, colloids and solutions are different kinds of "mixtures" comprising at least two components, notionally called A and B. The difference lies in the size (diameter, extension) of the particles of A surrounded by B.

In the case of suspensions and colloids, A is generally a solid and B is a liquid. The solid particles of a suspension are so coarse that they settle to the bottom of the container when stirring stops. The solids in a colloid are ground down to a size of about $1/1000$ millimeter or less, so that thermal motion, electrostatic repulsion and other forces usually keep the particles aloft. Yet even in a colloid, there are still identifiable chunks of matter present, though "visible" only under the electron microscope or indirectly by light scattering.

In the case of solutions, on the other hand, the "fineness of division" goes down right to the atomic (or molecular) scale, that is millionths of a millimeter. Solutions of A in B can only be made if A is soluble in B, that is if the molecules of B have an "affinity" to those of A which surpasses the affinity of the A and B molecules among themselves. The solubility, however, is also influenced by the increase of "disorder" which happens upon dissolution.

So generally when most water treatment products are added to water, at the very first moment, a suspension is formed, which, in certain cases spontaneously transforms into a solution. This only occurs if the water treatment product is soluble in water. Some materials for example silicon dioxide, are practically insoluble in water.

For dispensing into a fluid stream, conventional solid, powdered or granular water treatment products are first diluted with a fluid, usually water, in concentrations up to approximately 360 kg/m$^3$ or 3 lbs/gallon (US). This initial mixing could be done in a processing facility, for the packaging and delivery of liquid product to the customer, or it could be done on-site at the point-of-use through what are referred to as day-tanks, flow-through type dispensers, or bypass type dispensers. With the addition of elemental components, such as zinc, the elemental component would first be dissolved in an acid solution then added to the water treatment product. This limits the use of elemental components in deliverable solid, powdered or granular water treatment products.

The abovementioned products and delivery forms all have their shortcomings. The novel new form of the material in this invention has demonstrated desirable characteristics of limited solubility and controlled solubility that are sought after in the water treatment industry. The present invention is designed to be easier to use, easier to transport (lending itself to mail-order shipping and servicing), provides higher capacity in a more reliable, cleaner, and manageable form. The water treatment product of this invention is particularly important for the provision of another alternative of water treatment to the customer.

BRIEF SUMMARY OF THE DISCLOSURE

The present invention is directed to an improved water treatment product, packaging, dispensing, and delivery means, which may at least partially overcome the above-mentioned disadvantages or provide the consumer with a useful or commercial choice.

In one form, the invention resides in a water treatment product comprising a mixture of at least one active ingredient and a first fluid, wherein the concentration of the active ingredient is at least 50% on a weight basis and the viscosity of the mixture is at least 2,000 centipoise or 2 pascal seconds, the mixture adapted to be further diluted upon addition to a second fluid stream to be treated.

In the present composition, the viscosity of the mixture may preferably range from a heavy syrup (viscosity of above approximately 2,000 centipoise or 2 Pa.s) to a thick paste (viscosity of approximately 50,000 centipoise or 50 Pa.s). These viscosities may preferably be achieved by mixing powdered or granular ortho and polyphosphate blends with the preferred first fluid, water, at weight ratios in the order of 50:50 to 80:20, respectively. The mixture may also be referred to as a gel. Other active ingredients that may be used in the mixture described above include elemental or compound forms of zinc, magnesium, copper, calcium, nitrites, nitrates, molybdates, dispersants, biocides, and biostats, but it is to be understood that this list is in no way intended to be limiting. Active ingredients may preferably be used in combination or separately.

The active ingredient in the water treatment product may suitably be any chemical, biological or other material suitable for treating a fluid. The active ingredient may for example, be suitably directed towards the treatment of corrosion, scale, deposits, and microbiological problems of pipes and equipment through which the fluid may flow. In a particularly preferred form, the active ingredient may be orthophosphate, polyphosphate or silicate. Also, elemental zinc may be added to the water treatment product at the point of packaging in order to provide increased effectiveness. It is preferred that the zinc may be added immediately prior to sealing the packaging container.

In a second form, the invention resides in an improved packaging means, which incorporates a water treatment product installed in a stand-up pouch. The pouch may for example be similar to the type described in WO9118797 or EP0620156. These inventions are generally directed to flexible, plastic pouches for containment of a liquid. The pouches are formed from flexible-plastic material as to have a unitary base portion which allows the liquid container or pouch to stand upright. The flexible-plastic liquid containers or pouches containing the above-mentioned water treatment product as well as other sorts of liquids may preferably be transparent, translucent, or opaque, generally for purposes of catching the eye of the consumer. A further aspect of this invention may include the use of flexible tube type containers, similar to those used for toothpaste. A further aspect of this invention includes the use of pouches made of a water-soluble material that would gradually dissolve after placement of the pouch in water, preferably releasing the product at a rate partially determined by the solubility rate of the package.

The water treatment product installed in the pouch could be any suitable product. It is anticipated that the water treatment product described above may be contained in the packaging means. Equally a liquid, suspension or granular solution may be contained. These packages may suitably serve as a type of "refill cartridge" for water treatment dispensing apparatuses, preferably with a label indicating material approved for potable water applications.

In a particularly preferred embodiment of the abovementioned packaging means, the packaging means may preferably be made to be engageable with an opening of a chemical holding container of a bypass or flow-through type dispenser. The opening in the chemical holding container of a bypass or flow-through type dispenser may be provided at any location on the container but a particularly preferred location may be the base of the container or a side wall. The water treatment product package may suitably be squeezed, thereby forcibly injecting the water treatment liquid or gel into the holding container. One particularly preferred method of applying force to the flexible tube type containers, similar to those used for toothpaste is through the use of a roll-up tool generally comprising a pair of spaced apart arm members adapted to engage the base of the tube and maintain the base between the arm members as the tool is rotated, rolling the flexible tube about the arm members. This alleviates work associated with having to pour into a funnel, or waiting for the material to flow out of the package into the container by gravity alone.

Alternatively, the packaging means may be associated with the chemical holding container via a tube, directly with the container or indirectly through attachment to the pipe through which the fluid to be treated flows. The tube may be provided with connectors at at least one end thereof in order to attach the tube to the packaging means and/or the chemical holding container. The connectors may be threaded connectors allowing removable attachment.

According to a particularly preferred embodiment of the invention, the tube may be attachable more or less permanently to the chemical holding container using a threaded type connector as described above. The opposite end of the tube may not have a connector, but be left bare. According to this embodiment, the tube may be forced into a correspondingly-sized opening in the packaging means and maintained there by an interference type fit. The opening of the packaging means may be provided with a sealing means for improving the seal between the tube and the opening of the packaging means.

A unique arrangement of "tees" or access ports and valves may be provided to a water treatment dispensing apparatus allowing the recharging of the dispenser apparatus without the need to remove the cap. Particularly, at least one non-return valve may be used with any fitting preventing backflow of the treatment product into the packaging means. This method may also allow the dispenser to be recharged without having to turn off the water pressure, alleviating the nuisance of disrupting water service to occupants or equipment.

The water treatment packaging means may preferably be equipped with a pouring spout that engages either directly, or via a tube or connector, with a water treatment dispensing apparatus' filler opening, access-tee, or port. Also, the packaging means may be a removable and disposable "cartridge" that would be used with a flow-through type dispenser.

The tube or packaging means may be associated with the chemical holding container of the water treatment dispenser or may be associated with a pipe or the like through which the fluid to be treated flows. Appropriate fittings may be provided to allow the association with the pipe or the dispensing apparatus.

In smaller, point-of-use type, bypass or flow-through type dispenser, the most widely used water treatment materials are either powdered, platelet, granular, or solid products. These materials slowly dissolved and are dispensed into the water flow-stream. This action is referred to as "controlled solubility" or "limited solubility". The vessel in which the water treatment product is contained typically requires regular flushing. This is typically caused because insoluble compounds form in the dispensers causing the materials to cake-up, or become mushy, and clog the dispenser fittings and tubing.

With powdered, platelet, granular, or solid water treatment products, the formation of insoluble materials limits the time the dispensers can be used without servicing. In some cases, more than 50% of the water treatment product can be transformed into an insoluble mush (typically a form of calcium phosphate).

The inventor's observations have shown that the use of the improved packaging means of the present invention greatly mitigates the problem of insoluble products forming in dispensers and provides improved characteristics in terms of controlled solubility and limited solubility. These features greatly improve the function and reliability of the dispensing equipment. Consequently, the dispensers can operate for a longer period of time between servicing.

Also, with the use of the liquid gel product, the inventor found that not only is the problem of insoluble products forming in dispensers mitigated and improved characteristics in terms of controlled solubility and limited solubility realised, but the problem of air entrapment that is common with the use of powdered, granular, or solid products, has been greatly reduced, if not eliminated. Typical with powdered, platelet, granular, or solid products, after the operator pours in the material and fills the dispensing vessel with water, a period of time must be allowed for all the material to soak, and the entrapped air or gases to rise up and out of the material. Typically, a bleed-screw is used to attempt to vent out all of the entrapped air or gas after the vessel has been pressurized. Again, the water treatment product of the present invention has greatly reduced this problem and provides faster and more reliable servicing of the dispensing equipment.

Liquid materials used for water treatment are of sufficient viscosities to accommodate metering pumps. The weight ratio of phosphate powder to water in a typical water treatment phosphate liquid for example, would be in the order of 30:70, respectively. This material would have a lower viscosity value than that defined above for use as a water treatment gel. The water treatment product of the present invention is not generally suitable for metering pump applications, having a higher viscosity in the order of 2,000 to 50,000 centipoise. The product of the present invention is particularly adapted and directed to use in point-of-use bypass or flow-through type dispensers, or in other usages where the gel could first be diluted and then dispensed with a metering pump. Also the product could provide improved performance in what are referred to as "day tanks", vessels that are filled on a near daily basis for treating large quantities of water. A key part of the function of the product is that the dissolution rate is independent of the amount of the material in the dispenser, and directly a function of the surface area exposed to the unsaturated water causing it to be consumed at a constant rate.

The invention according to the present invention may also reside in a method for refilling a water treatment dispensing apparatus using an improved packaging means as described herein, the method comprising the steps of operatively associating the improved packaging means containing water treatment product with the dispensing apparatus and applying a force to the improved packaging means to force the water treatment product into the water treatment dispensing apparatus.

Preferably, the water treatment dispensing apparatus will comprise a chemical holding container for holding chemical, the container having an attachment for a flow entry means for directing fluid flow into the chemical holding container and a flow exit means for directing fluid flow out of the chemical holding container, the chemical holding container having an opening means which is releasably engageable for refilling.

The chemical holding container normally is charged with a predetermined amount of a chemical which is dispensed into the fluid to be treated. The amount of chemical in the chemical holding container therefore would normally decrease over time as chemical was used.

The improved packaging means according to an aspect of the present invention preferably contains replacement chemical for recharging the chemical holding container. According to the preferred embodiments of the improved packaging means, preferred steps in the method for refilling the water treatment dispensing apparatus are disclosed.

Suitably the step of operatively associating the improved packaging means containing water treatment product with the dispensing apparatus may comprise orienting an opening in the improved packaging means with an opening in the chemical holding container of a dispenser. The opening in the chemical holding container of a dispenser may be provided at any location on the container but a particularly preferred location may be the base of the container or a side wall. The respective openings may be releasably secured adjacent one another while the refilling takes place.

Alternatively, the packaging means may be associated with the chemical holding container via a tube, either directly with the container or indirectly through attachment to the pipe through which the fluid to be treated flows. The tube may be provided with connectors at at least one end thereof in order to attach the tube to the packaging means and/or the chemical holding container. The connectors may be threaded connectors allowing removable attachment.

According to a particularly preferred embodiment of the invention, the tube may be attachable more or less permanently to the chemical holding container using a threaded type connector as described above. The opposite end of the tube may not have a connector, but may be left bare. According to this embodiment, the tube may be forced into a correspondingly-sized opening in the packaging means and maintained there by an interference type fit. The opening of the packaging means may be provided with a sealing means for improving the seal between the tube and the opening of the packaging means.

A unique arrangement of "tees" or access ports and valves may be provided to a water treatment dispensing apparatus allowing the recharging of the dispenser apparatus without the need to remove the cap of the chemical dispenser. Particularly, at least one non-return valve may be used with any fitting preventing back-flow of the treatment product into the packaging means. This method may also allow the dispenser to be recharge without having to turn off the water pressure, alleviating the nuisance of disrupting water service to occupants or equipment. The chemical dispenser may be associated with a venting assembly allowing the refilling of the chemical holding container without a build-up of pressure within the chemical holding container. The vent may be opened after the attachment of the improved packaging means to allow the entry of the refilling chemical to displace fluid from the chemical holding container to maintain the pressure therein.

The water treatment packaging means may preferably be equipped with a pouring spout that engages either directly, or via a tube or connector, with a water treatment dispensing apparatus' filler opening, access-tee, or port. Also, the packaging means may be a removable and disposable "cartridge" that would be used with a flow-through type dispenser.

The tube or packaging means may be associated with the chemical holding container of the water treatment dispenser or may be associated with a pipe or the like through which the fluid to be treated flows. Appropriate fittings may be provided to allow the association with the pipe or the dispensing apparatus.

The water treatment product package may suitably be squeezed, thereby forcibly injecting the water treatment liquid or gel into the holding container. One particularly preferred method of applying force to the flexible tube type containers, similar to those used for toothpaste is through the use of a roll-up tool generally comprising a pair of spaced apart arm members adapted to engage the base of the tube and maintain the base between the arm members as the tool is rotated, rolling the flexible tube about the arm members. This alleviates work associated with having to pour into a funnel, or waiting for the material to flow out of the package into the container by gravity alone.

DETAILED DESCRIPTION

Figure 1:
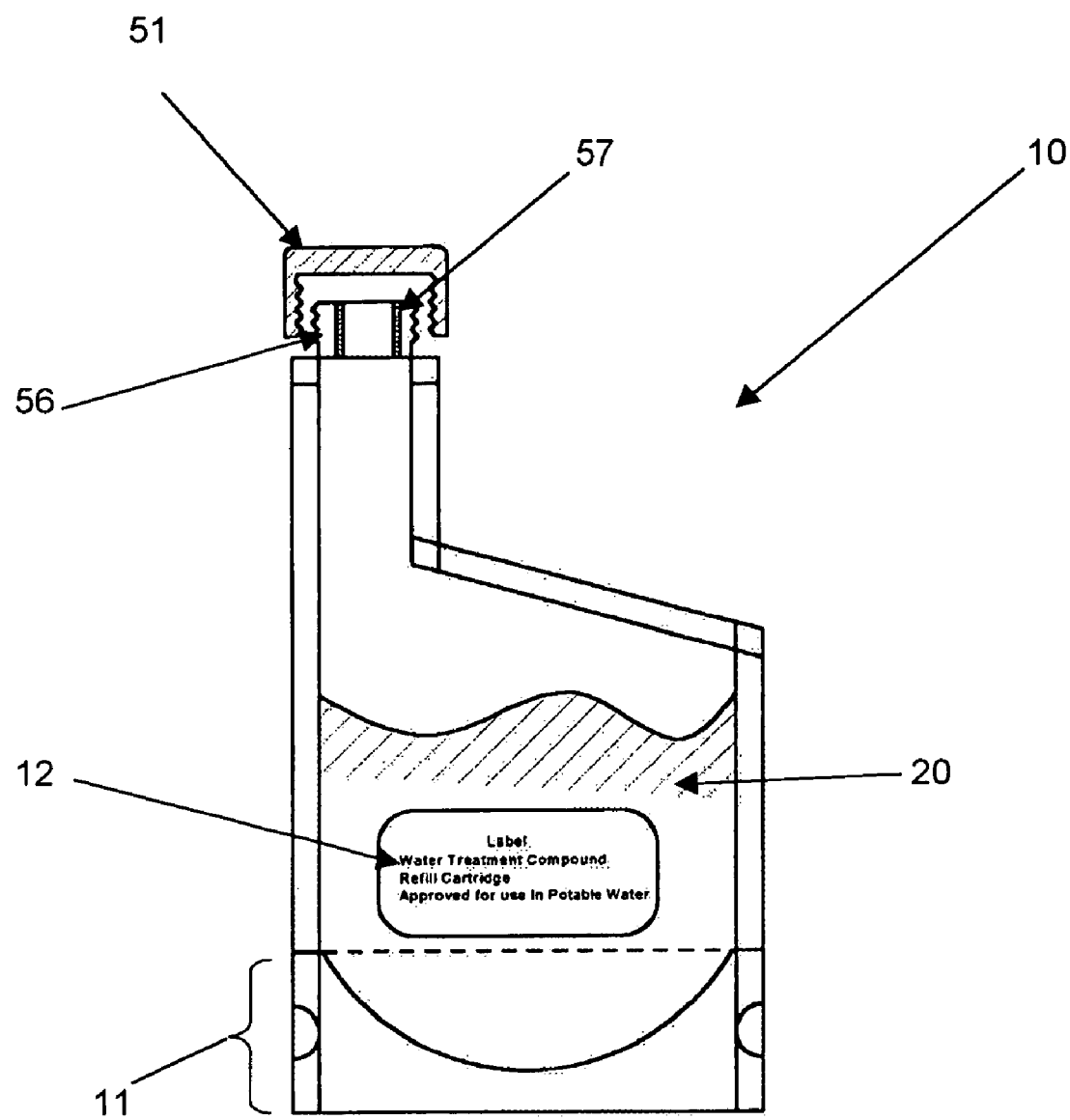
FIG. 1 Stand-up pouch refill cartridge used for water treatment liquid and gel material with spout, removable cap, and Label. In this case the pouring spout can be engaged by threading into a receiving end of a chemical dispenser allowing the product to be forcibly squeezed into the dispenser.
Figure 4:
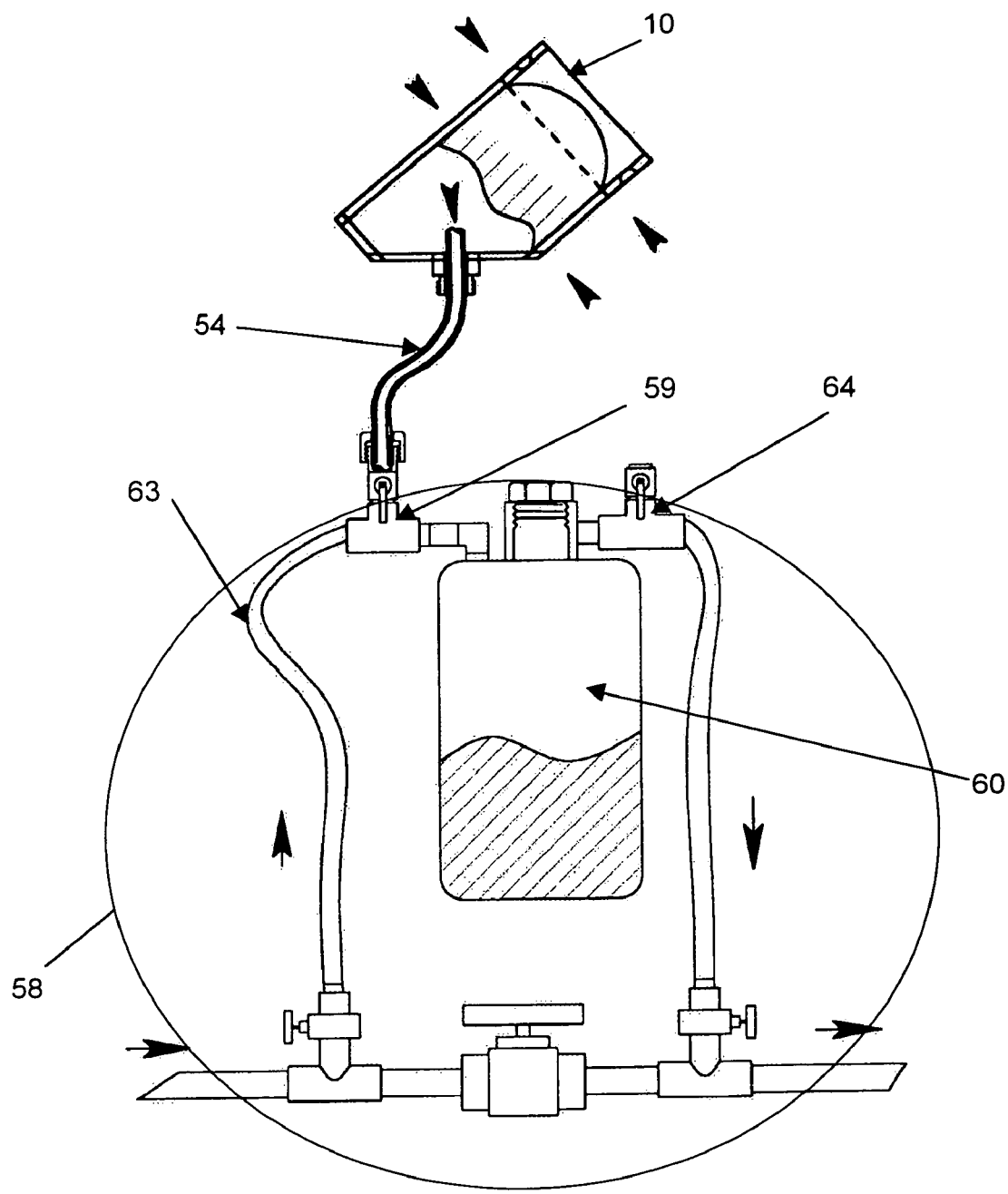
FIG. 4 Refilling of bypass type of dispenser with stand-up pouch refill cartridge with modified spout and pressure tight removable tube. A vent fitting is shown that allows liquid to be vented as it is displaced by fresh new liquid or gel product. Arrows show denser product being forcibly squeezed into chemical holding container and settling to the bottom.
Figure 5:
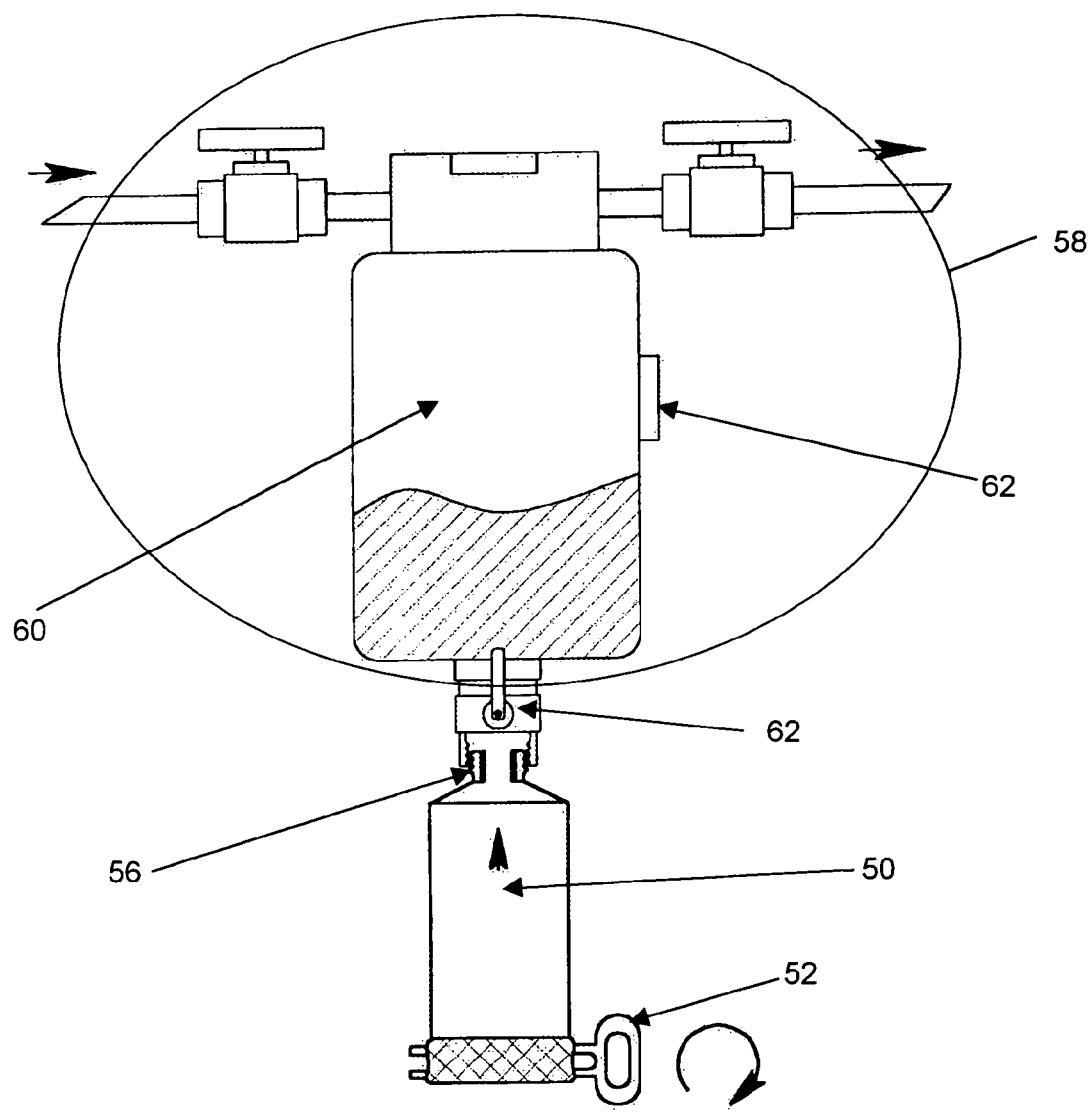
FIG. 5 Refilling of flow-through type of dispenser modified to accommodate a threadably engagable refill cartridge with a roll-up tool. Arrows show product being forcibly squeezed into chemical holding container. Removable container could be disposable type refill cartridge. Flow-through dispenser could be a modified standard filter housing. This process could be followed without turning the water pressure off.

According to one aspect, the invention may further comprise an improved packaging means, which incorporates the above mentioned water treatment product 20. The water treatment product 20 is installed in a stand-up pouch 10, or tube 50. Stand up pouches 10 are flexible, plastic pouches for containment of a liquid or other type of material. The pouches 10 are formed from flexible-plastic material to have a unitary base portion 11 which allows the pouch to stand upright. The pouch 10 illustrated in FIG. 1 and the tube 50 illustrated in FIG. 2, both have removable threaded caps 51. The flexible-plastic pouches 10 containing the above-mentioned water treatment product 20 as well as other sorts of liquids can be transparent, translucent, or opaque, generally for purposes of catching the eye of the consumer. They will generally have a label 12 so that consumers or users can identify the substance 20 in the pouch 10. These pouches 10 serve as a type of "refill cartridge" for water treatment dispensing apparatuses 13 as seen in FIG. 4 and 5 in particular.

Figures 2, 2A:
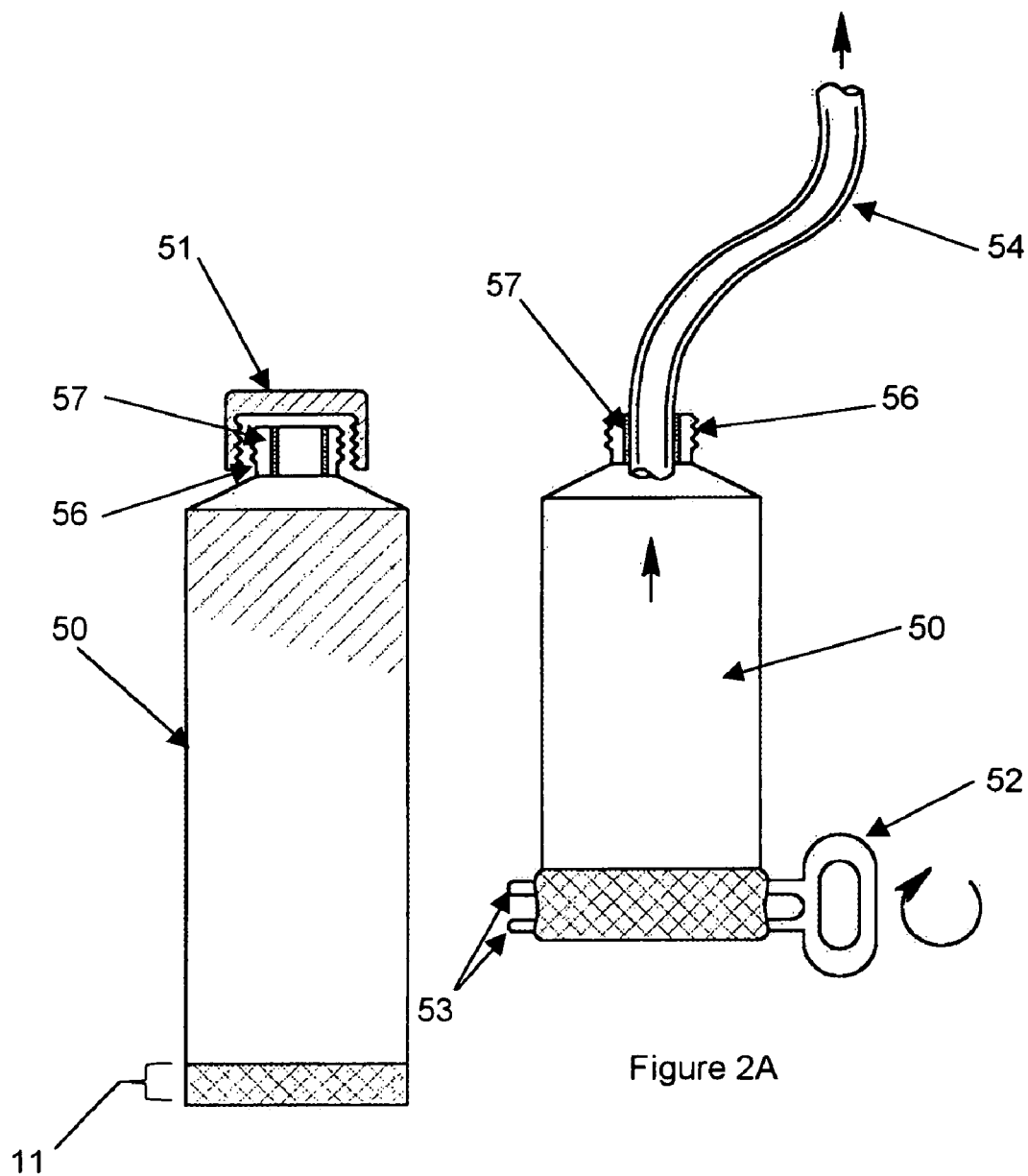
FIG. 2. A conventional tube package with a pouring spout that can be engaged by threading into a receiving end of a chemical dispenser.
FIG. 2A A conventional tube package with a specifically designed spout that is made to create a pressure tight fit between the inside diameter of the spout and the outside diameter of a removable tube. Also shown is a tool used to roll-up the tube to forcibly squeeze the liquid or gel product into the dispenser.

According to a second aspect, the invention may further comprise a flexible tubular packaging means as illustrated in FIG. 2. The tube 50 are formed from flexible-plastic material to have a unitary base portion 11 which allows the tube 50 to stand upright. A particularly preferred method of applying force to the flexible tube type containers 50, similar to those used for toothpaste is illustrated in FIG. 2A. A roll-up tool is used 52. The tool 52 generally comprises a pair of spaced apart arm members 53 adapted to engage the base 11 of the tube 50 and maintain the base 11 between the arm members as the tool 52 is rotated, rolling the flexible tube about the arm members 53. This alleviates work associated with having to pour the chemical into a funnel, or waiting for the material to flow out of the package into the container by gravity alone.

Figure 3:
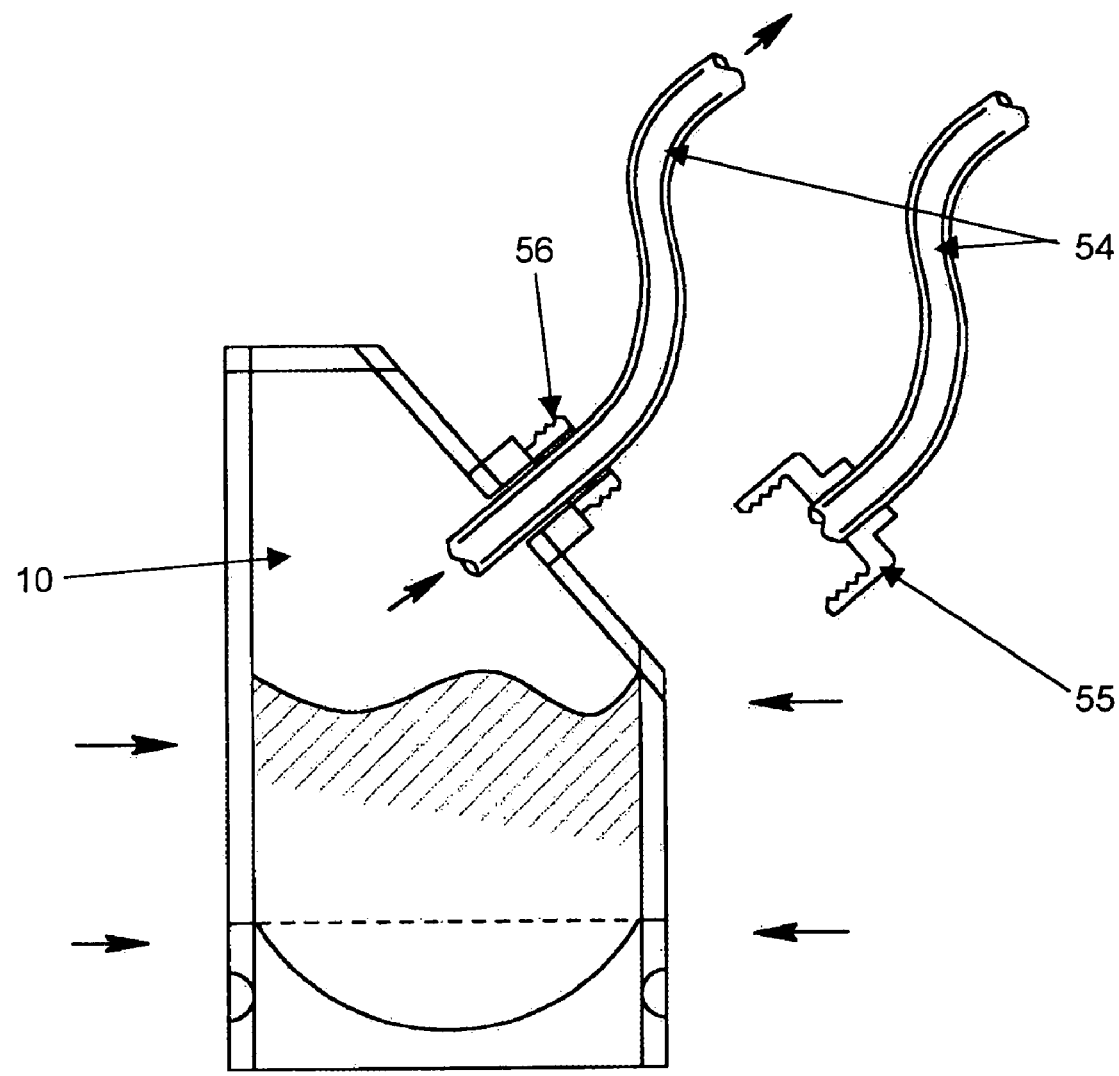
FIG. 3 A modified stand-up pouch with a pouring spout specifically designed to create a pressure tight fit between the inside diameter of the spout and the outside diameter of a removable tube. In this drawing a cap is shown can be screwed onto the spout of the poach creating a pressure tight seal that allows the material to be forcibly squeezed out the tube.

The packaging means 10 illustrated in FIG. 3 is designed to be associated with the chemical holding container of a water treatment dispenser apparatus via a tube 54, indirectly through attachment to the pipe 63 (FIG. 4) through which the fluid to be treated flows. The tube 54 may be provided with connectors at at least one end thereof in order to attach the tube to the packaging means and/or the chemical holding container.

According to a particularly preferred embodiment of the invention, the tube 54 is attachable more or less permanently to the chemical holding container using a threaded type connector 55 as described above. The opposite end of the tube 54 does not have a connector 55, but is left bare. According to this embodiment, the tube 54 is forced into a correspondingly-sized opening 56 in the pouch 10 or tube 50 and maintained there by an interference type fit. The opening 56 of the pouch 10 or tube 50 is provided with a sealing means 57 for improving the seal between the tube 54 and the opening 56 of the pouch 10 of tube 50.

As seen in FIG. 4, the tube or packaging means may be associated with the chemical holding container 60 of the water treatment dispenser or may be associated with a pipe 63 or the like through which the fluid to be treated flows. Appropriate fittings may be provided to allow the association with the pipe 63 or the dispensing apparatus.

A unique arrangement of "tees" 59 or access ports and valves may be provided to a water treatment dispensing apparatus 58 allowing the recharging of the chemical holding container 60 without the need to remove the cap 61. This configuration also allows the chemical holding container 60 to be recharged without having to turn off the water pressure, alleviating the nuisance of disrupting water service to occupants or equipment.

The chemical dispenser is associated with a vent 64 allowing the refilling of the chemical holding container 60 without a build-up of pressure within the chemical holding container 60. The vent 64 is opened after the attachment of the tube 53 or pouch 10 to allow the entry of the refilling chemical to displace fluid from the chemical holding container 60 to maintain the pressure therein.

The pouch 10 can be squeezed, thereby forcibly injecting the water treatment product 20 into the holding container. This alleviates work associated with having to pour into a funnel, or waiting for the material to flow out of the pouch 10 into the container by gravity alone.

As seen in FIG. 5, the opening 56 of the tube 50 may be associated directly with a water treatment dispensing apparatus' filler opening, access-tee, or port 62. In this embodiment, the filler opening is located at the bottom of the chemical holding container 60. An alternative position of the port 62 is shown ion the side of the container 60. The tube 53 may suitably be squeezed using the tool 52 thereby forcibly injecting the water treatment liquid or gel into the holding container 60.

Figure 6:
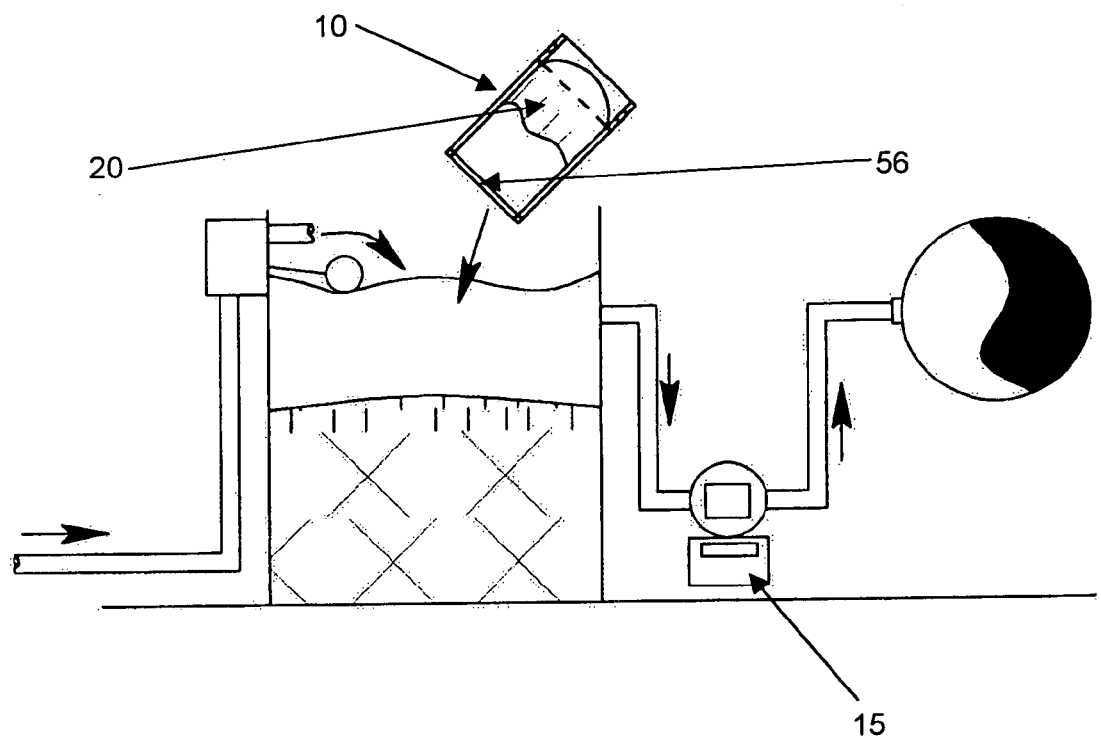
FIG. 6 Refilling of solution-tank type of dispenser with larger container or stand-up pouch refill cartridge. The container could be as large as 55-gallon drum. The arrow shows product being dropped into chemical holding container. The chemical holding tank is not pressurised. Drawing shows mechanical metering pump pumping water treatment solution into pressurized pipeline. Pouch could be made of a water-soluble material that would gradually dissolve after placement in water, preferably releasing the product at a rate partially determined by the solubility rate of the package.

Although the water treatment product 20 is not generally suitable for metering pump applications, having the higher viscosities in the order of 2,000 to 50,000 centipoise, it does lend itself to usage in point-of-use bypass or flow-through type dispensers as seen in FIGS. 4 and 5, or in other usages where the water treatment product would first be diluted and then dispensed with a metering pump 15, as seen in FIG. 6. The water treatment product pouch 10 could be made of a water-soluble material that would gradually dissolve after placement in water in dispensing container or vessel, preferably providing a more controlled solubility of the water treatment product in a day-tank application. In the case of using a solid, powdered or granular product, the addition of an elemental component to the water treatment product, such as zinc, into the package, just before the package 10 is sealed would preferably allow for a more consistent dispersion of the elemental compound in the day-tank or the point-of-use type dispenser.

The invention claimed is:

1. A process for filling a chemical holding dispenser associated with a dispensing apparatus for a fluid treatment chemical comprising:
 a) providing a fluid flow system capable of carrying a fluid flow stream;
 b) operatively associating the dispensing apparatus with the fluid flow system for direct or indirect fluid communication between the holding dispenser and a flow stream;
 c) providing a deformable flexible packaging container containing a gel having a viscosity of at least 2000 centipoises and comprising a fluid treatment chemical as an active ingredient;
 d) placing the flexible container in direct or indirect fluid communication with the chemical holding dispenser; and
 e) deforming the flexible container with a human-generated force sufficient to expel the gel into the holding dispenser to fill or refill the dispenser.

2. A process for filling a chemical holding dispenser according to claim 1, wherein in step d) the flexible container is placed in communication with the holding dispenser by associating an opening in the packaging container with an opening in the chemical holding dispenser.

3. A process for filling a holding dispenser according to claim 2, wherein the opening in the packaging container is directly associated with the opening in the chemical holding dispenser.

4. A process for filling a holding dispenser according to claim 2, wherein the opening in the packaging container is indirectly associated with the opening in the chemical holding dispenser.

5. A process for filling a holding dispenser according to claim 4, wherein one end of a tube is permanently attached to the opening in the chemical holding dispenser and the other end of the tube is removably engaged with the flexible container.

6. The process of claim 1, wherein the fluid treatment chemical is an antiscaling agent or an anticorrosive.

7. The process of claim 6, wherein the fluid treatment chemical is at least one of an orthophosphate, polyphosphate, or silicate.

8. The process of claim 1, wherein the dispensing apparatus is a point-of-use apparatus.

9. The process of claim 1, wherein the dispensing apparatus is a bypass or flow-through apparatus.

10. The process of claim 1, wherein the fluid is water.

11. The process of claim 1, wherein the force is applied by squeezing.

12. The process of claim 11, wherein the flexible packaging container is a flexible tube having a base for supporting the tube in an upright position.

13. The process of claim 12, wherein the squeezing force applied to the flexible tube is a roll-up squeezing force.

14. The process of claim 13, wherein the tube is squeezed with a roll-up tool.

15. A process for treating a fluid flow stream with a fluid treatment chemical, comprising:
 a) providing a dispensing apparatus including a chemical holding dispenser for the fluid treatment chemical;
 b) operatively associating the dispensing apparatus with a fluid flow system capable of carrying a flow stream, for direct or indirect fluid communication between a system flow stream and the holding dispenser;
 c) providing a deformable flexible packaging container containing a gel having a viscosity of at least 2000 centipoises and comprising a fluid treatment chemical as an active ingredient;
 d) placing the flexible container in direct or indirect fluid communication with the chemical holding dispenser;
 e) deforming the flexible container with a human-generated force sufficient to expel the gel into the holding dispenser to fill or refill the container;
 f) initiating a flow stream through the system and diverting a portion of the stream through the dispensing apparatus and the gel-filled holding dispenser, so that the gel is admixed into the flow stream to produce a chemically treated fluid in the system downstream of the apparatus.

16. The process of claim 15, wherein the fluid flow system is a pressurized water system, and the fluid treatment chemical is an antiscaling agent or an anticorrosive.

17. A process for filling a chemical holding dispenser according to claim 16, wherein in step b) the dispensing apparatus is further associated with a venting assembly for maintaining the pressure level within the chemical holding dispenser, and the process further comprises a step of opening the venting assembly after placement of the flexible container in step d) to allow the displacement of fluid from the chemical holding dispenser while maintaining the pressure therein.

18. The process of claim 16, wherein the fluid treatment chemical is at least one of an orthophosphate, polyphosphate, or silicate.

19. The process of claim 15, wherein the dispensing apparatus is a point-of-use apparatus.

20. The process of claim 15, wherein the dispensing apparatus is a bypass or flow-through apparatus.

21. The process of claim 15, wherein the fluid is water.

22. The process of claim 15, wherein the force is applied by squeezing.

23. The process of claim 22, wherein the flexible packaging container is a flexible tube having a base for supporting the tube in an upright position.

24. The process of claim 23, wherein the squeezing force applied to the flexible tube is a roll-up squeezing force.

25. The process of claim 24, wherein the tube is squeezed with a roll-up tool.

* * * * *